US010497085B2

(12) United States Patent
Lee et al.

(10) Patent No.: US 10,497,085 B2
(45) Date of Patent: Dec. 3, 2019

(54) GRAPHICS PROCESSING METHOD AND SYSTEM

(71) Applicant: SAMSUNG ELECTRONICS CO., LTD., Suwon-si, Gyeonggi-Do (KR)

(72) Inventors: Won-Jong Lee, Seoul (KR); Sang-oak Woo, Anyang-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 37 days.

(21) Appl. No.: 15/698,010

(22) Filed: Sep. 7, 2017

(65) Prior Publication Data

US 2018/0189925 A1 Jul. 5, 2018

(30) Foreign Application Priority Data

Jan. 4, 2017 (KR) ........................ 10-2017-0001314

(51) Int. Cl.

| | |
|---|---|
| ***G06T 15/40*** | (2011.01) |
| ***G06T 1/20*** | (2006.01) |
| ***G09G 5/36*** | (2006.01) |
| ***G06T 1/60*** | (2006.01) |
| ***G06T 7/50*** | (2017.01) |
| ***G06T 11/40*** | (2006.01) |
| ***G06T 15/00*** | (2011.01) |

(52) U.S. Cl.

CPC .................. *G06T 1/20* (2013.01); *G06T 1/60* (2013.01); *G06T 7/50* (2017.01); *G06T 11/40* (2013.01); *G06T 15/005* (2013.01); *G06T 15/40* (2013.01); *G09G 5/363* (2013.01)

(58) Field of Classification Search

None

See application file for complete search history.

(56) References Cited

U.S. PATENT DOCUMENTS 6,525,726 B1 2/2003 Xie et al.
7,167,181 B2 1/2007 Duluk, Jr. et al.

(Continued)

FOREIGN PATENT DOCUMENTS

EP 2 860 700 4/2015

OTHER PUBLICATIONS

European Search Report issued in corresponding application No. 17198986.6 dated Apr. 23, 2018.

(Continued)

*Primary Examiner* — Andrew G Yang

(74) *Attorney, Agent, or Firm* — F. Chau & Associates, LLC

(57) ABSTRACT

A graphics processing method and a graphics processing system are provided. A graphics processing method including: estimating a depth complexity of a tile generated by dividing a frame; visibility calculations are selectively performed with respect to at least one primitive included in the tile based on the estimated depth complexity of the tile; and performing rendering on the tile. A graphics processing apparatus includes one or more processors which determine a depth complexity of primitives input to a current tile and whether translucent primitives exist. The graphics processing apparatus may operate adaptively in a Tile Based Rendering (TBR) mode or a Tile Based Deferred Rendering (TBDR) mode according to the determination of depth complexity and a presence of translucent primitives.

24 Claims, 8 Drawing Sheets

(56) References Cited

U.S. PATENT DOCUMENTS

| | | | |
|---|---|---|---|
| 8,686,998 B2 | 4/2014 | Morphet | |
| 8,982,136 B2 | 3/2015 | Ribble et al. | |
| 8,988,441 B2 | 3/2015 | Hutchins | |
| 9,105,131 B2 | 8/2015 | Howson | |
| 9,342,322 B2 | 5/2016 | Pelton et al. | |
| 9,342,430 B2 | 5/2016 | Diesi | |
| 9,639,971 B2 | 5/2017 | Jeong et al. | |
| 2004/0091160 A1* | 5/2004 | Hook | G06T 9/00 382/239 |
| 2013/0135322 A1 | 5/2013 | Seetharamaiah et al. | |
| 2013/0207977 A1 | 8/2013 | Howson | |
| 2013/0222379 A1 | 8/2013 | Jang et al. | |
| 2014/0198119 A1* | 7/2014 | Seetharamaiah | G06T 15/005 345/581 |
| 2014/0267259 A1 | 9/2014 | Frascati et al. | |
| 2014/0327671 A1 | 11/2014 | Nystad et al. | |
| 2014/0354682 A1* | 12/2014 | Heggelund | G06T 1/20 345/619 |
| 2015/0022525 A1* | 1/2015 | Grenfell | G06T 15/005 345/427 |
| 2015/0084981 A1* | 3/2015 | Clarberg | G06T 11/40 345/614 |
| 2015/0097831 A1 | 4/2015 | Doffinger | |
| 2015/0248591 A1* | 9/2015 | Shi | G06K 9/46 382/195 |
| 2015/0363969 A1 | 12/2015 | Yang | |
| 2015/0379727 A1 | 12/2015 | Golas et al. | |
| 2016/0098856 A1* | 4/2016 | Broadhurst | G06T 15/405 345/422 |
| 2016/0117855 A1 | 4/2016 | Lee et al. | |
| 2016/0125649 A1 | 5/2016 | Jeong et al. | |
| 2016/0180539 A1 | 6/2016 | Liao et al. | |
| 2016/0217608 A1 | 7/2016 | Howson | |
| 2018/0165792 A1* | 6/2018 | Tavakoli | G06T 3/0012 |

OTHER PUBLICATIONS

Guthe et al., "Near Optical Hierarchical Culling: Performance Driven Use of Hardware Occlusion Queries", Proceedings of the Sixteenth Eurographics Conference on Rendering Techniques, Jun. 26, 2006, pp. 207-214.

* cited by examiner

FIG. 4

| | | | | | | | |
|---|---|---|---|---|---|---|---|
| 1 | 1 | 0 | 0 | 0 | 0 | 1 | 1 |
| 1 | 1 | 1 | 0 | 1 | 2 | 1 | 1 |
| 1 | 1 | 1 | 2 | 2 | 2 | 2 | 1 |
| 1 | 1 | 1 | 3 | 3 | 2 | 2 | 2 |
| 0 | 1 | 2 | 2 | 3 | 3 | 2 | 2 |
| 0 | 2 | 2 | 2 | 2 | 3 | 3 | 2 |
| 0 | 2 | 2 | 2 | 2 | 2 | 2 | 3 |
| 1 | 2 | 2 | 2 | 1 | 1 | 1 | 1 |

414

411

412

413

GRAPHICS PROCESSING METHOD AND SYSTEM

CROSS-REFERENCE TO RELATED APPLICATION

This application claims the benefit of Korean Patent Application No. 10-2017-0001314, filed on Jan. 4, 2017, in the Korean Intellectual Property Office, the disclosure of which is incorporated by reference herein.

1. Technical Field

The present disclosure relates to graphics processing methods and apparatuses.

2. Discussion of the Related Art

With the recent development of the mobile device market, graphics processing techniques are being developed to meet the specifications of mobile devices. Graphics processing technology may be classified as immediate mode rendering (IMR), in which rendering is immediately performed every time a primitive of object data is generated in a geometry stage, and tile-based rendering (TBR), in which a frame is divided into virtual tiles to perform rendering on each tile. Among these modes, TBR allows for a reduction in memory bandwidth and may reduce power consumption. Thus, TBR is frequently used in mobile devices for which power consumption is one of the main design considerations.

TBR may enhance rendering performance through tile-based deferred rendering (TBDR) which minimizes the amount of overdraw in which covered fragments are rendered, and renders only visible fragments. For example, overdraw may be reduced via hidden surface removal (HSR). However, there are certain operating conditions in which TBDR may not be useful or possible. Accordingly, a method to determine a mode for graphics processing may result in a reduction in power consumption under certain conditions.

SUMMARY

The inventive concept provides graphics processing methods and apparatuses.

Additional teachings of the inventive concept will be set forth in part in the description which follows and, in part, will be apparent from the description, or may be learned by practice of the presented embodiments.

According to an embodiment of the inventive concept, a graphics processing method includes: dividing a frame into a plurality of tiles; estimating a depth complexity of a tile of the plurality of tiles to determine an overlap between objects in the frame; selectively conducting visibility calculations with respect to at least one primitive included in the tile based on the estimated depth complexity of the tile; and performing rendering on the tile.

According to an embodiment of the inventive concept, a graphics processing system includes: a binning unit configured to estimate a depth complexity of a tile generated by a current frame being divided; a visibility testing unit configured to selectively conduct visibility calculations with respect to at least one primitive included in the tile based on the estimated depth complexity of the tile; and a rendering unit configured to perform rendering on the tile.

According to an embodiment of the inventive concept, a method of graphics processing operable by a graphics processing unit (GPU), the method includes: receiving a primitive stream comprising a plurality of primitives via a draw-call command from an Application Programming Interface (API); determining which of a plurality of tiles of a frame include a least a portion of one or more primitives of the primitive stream; estimating a depth complexity of each of the plurality of tiles based on an overlap of each tile and the at least a portion of one or more primitives; determining, when at least one primitive of the primitive stream includes translucent properties, whether the at least one primitive having translucent properties is located at a front portion or a back portion of the primitive stream; performing a visibility calculation on the plurality of tiles when the at least one primitive having translucent properties is located at the back portion of the primitive stream, and rendering the plurality of tiles; or rendering the plurality of tiles without performing a visibility calculation when the at least one primitive having translucent properties is located at the front portion of the primitive stream.

According to an embodiment of the inventive concept, the GPU operates in a tile based deferred rending (TBDR) mode for rendering one or more respective tiles of the plurality of tiles when the estimated depth complexity of the plurality of tiles is greater than a predetermined threshold, and the GPU operates in a tile based rendering (TBR) mode for rendering a remainder of the plurality of tiles when the estimated depth complexity is less than a predetermined threshold.

According to an embodiment of the inventive concept, the GPU performs the graphics processing method on the plurality of tiles in multiple-cores included in the GPU.

The performing of a visibility calculation is selectively performed on one or more of the plurality of tiles.

The performing of the visibility calculation comprises executing a ray tracing method to perform a visibility test on the at least a portion of one or more of the primitives of the primitive stream respectively included in at least one of the plurality of tiles.

BRIEF DESCRIPTION OF THE DRAWINGS

The inventive concept will be more readily appreciated from the following description of the embodiments, taken in conjunction with the accompanying drawings in which:

FIG. 4 illustrates a coverage table used to calculate an amount of overlap of at least one primitive included in a sub-tile, according to an example embodiment of the inventive concept;

DETAILED DESCRIPTION

Figure 1:
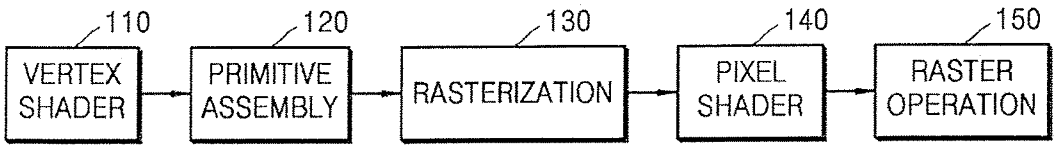
FIG. 1 illustrates an overview of an image rendering process.

Reference will now be made in detail to embodiments of the inventive concept, examples of which are illustrated in the accompanying drawings, wherein like reference numerals refer to like elements throughout. In this regard, the present embodiments may have different forms and should not be construed as being limited to the descriptions set forth herein. Accordingly, the embodiments of the inventive concept are described below, by referring to the figures, for illustrative purposes. Expressions such as "at least one of," when preceding a list of elements, modify the entire list of elements and do not modify the individual elements of the list.

The inventive concept now will be described more fully hereinafter with reference to the accompanying drawings, in which illustrative embodiments of the inventive concept are shown. The example embodiments described herein may be modified in different ways. For clarity of description of the features of the embodiments of the inventive concept, details that are well-known to one of ordinary skill in the art will be omitted.

The terms used in this specification are those general terms currently widely used in the art in consideration of functions with regard to the inventive concept, but the terms may vary according to the understanding of those of ordinary skill in the art, precedents, or new technology in the art. Also, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

Throughout the specification, a person of ordinary skill in the art should understand that when a component "includes" an element, unless there is another opposite description thereto, it should be understood that the component does not exclude another element but may further include another element. In addition, terms such as "... unit", "... module", or the like refer to units that perform at least one function or operation, and the units may be implemented as hardware or software or as a combination of hardware and software.

FIG. 1 illustrates an example of an image rendering process. The image rendering process includes operations 110 through 150.

Operation 110 is an operation of shading vertices. Prior to shading, vertices are generated to indicate objects included in an image. A vertex shader may perform shading on the vertices by assigning colors to the vertices.

Operation 120 is an operation of generating primitives. The term 'primitive' indicates a polygon formed of points, lines, or vertices. For example, primitives may be triangles formed by connecting vertices. However, primitives are not limited to being formed as triangles.

Operation 130 is an operation of rasterizing a primitive. When the primitive is rasterized, the primitive is divided into a plurality of fragments. The term 'fragment' refers to a portion of a primitive and may be a basic unit for performing image processing. A primitive includes only information about vertices. Accordingly, interpolation is performed when fragments between vertices are generated during a rasterization operation.

Operation 140 is an operation of shading pixels. Although shading is performed in units of pixels in FIG. 1, shading may be also performed in units of fragments. For example, when pixels or fragments are shaded, colors of the pixels or the fragments are assigned to pixels or fragments, respectively.

In operation 150, a raster operation is performed. In a raster operation, color blending, a depth test, or the like may be performed so as to generate raster images (pixels or samples) based on information about shaded pixels.

A raster image generated as described above is output to a frame buffer to be stored. Subsequently, a frame stored in the frame buffer may be displayed via a display device.

Figure 2:
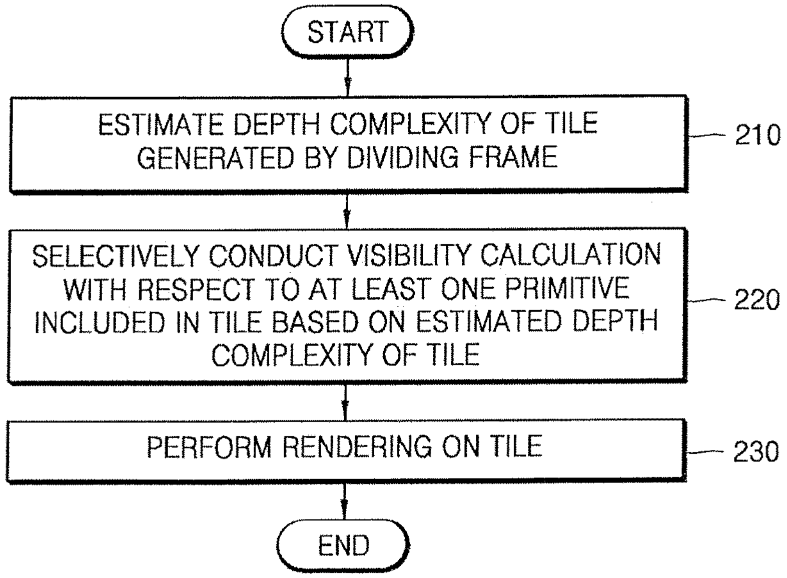
FIG. 2 is a flowchart of a graphics processing method according to an example embodiment of the inventive concept.

FIG. 2 is a flowchart of a graphics processing method according to an example embodiment of the inventive concept.

In operation 210, a graphics processing system estimates a depth complexity of a tile generated by dividing a frame. Depth complexity refers to an amount to which fragments, which are generated by rendering each object, overlap with each other according to a depth value. The graphics processing system may divide a frame to be processed into a plurality of tiles, and drive a binning pass during which primitives of the frame are classified according to which tile they belong to, and a bin-stream regarding the classification is stored in a memory. A binning pass may be operated using a binning unit. According to an example embodiment, the graphics processing system may estimate a depth complexity of a generated tile by driving a binning pass.

In addition, depth complexity is determined by calculating the number of times that fragments of primitives included in a tile overlap at given coordinates, in operation 150 of FIG. 1. Thus, depth complexity cannot be calculated before performing rendering. However, when rendering is performed, graphics processing on a predetermined tile is substantially completed. According to an example embodiment of the inventive concept, a processing method may be adaptively modified according to circumstances during graphics processing of a tile, in which a depth complexity of a tile is estimated (rather than calculated) before a rendering operation so as to be used later.

According to an example embodiment of the inventive concept, the graphics processing system may calculate an amount of overlap between a tile and at least one primitive included in the tile, and may estimate a depth complexity of the tile based on the amount of overlap. In addition, the graphics processing system may estimate a depth complexity of a tile, corresponding to the above tile, in a frame previous to a current frame as a depth complexity of the above tile. This operation will be described in further detail herein after.

With continued reference to FIG. 2, in operation 220, the graphics processing system selectively conducts visibility calculations of at least one primitive included in the tile based on the estimated depth complexity. According to an example embodiment, the graphics processing system compares the depth complexity estimated in operation 210 with a preset threshold value, and if the estimated depth complexity is greater than the preset threshold value, the graphics processing system may perform visibility calculations on the at least one primitive included in the tile.

However, if the estimated depth complexity is less than the preset threshold value, the graphics processing system may not perform visibility calculations on the at least one primitive included in the tile. In the case where visibility calculations are not performed, the graphics processing system may immediately execute operation 230 and perform rendering on the tile.

The graphics processing system may drive a depth prepass of reading a bin stream indicating to which tile a primitive on a frame belongs, from a memory, extracting, for example, only a visible primitive including a fragment visible on a screen and storing the visible primitive in the memory. The depth prepass is used to remove overdraws associated with rendering covered fragments on the screen, e.g., non-displayed fragments. In more detail, prior to performing rendering on fragments of primitives included in a tile, visibility of the fragments may be calculated based on a depth value of the fragments. Then, a visibility relationship between fragments is determined, and finally, only visible fragments are transferred to a rendering operation. By performing visibility calculations prior to rendering the tile, graphics processing performance may be enhanced by minimizing overdraws.

However, in some cases, calculating visibility prior to rendering may not result in an enhanced performance. For example, if a frame is to be processed as a low depth complexity frame, the cost due to overdraw, e.g., the cost of rendering covered fragments, may not be high, and the cost for driving an operation to calculate a visibility, e.g., the cost due to hardware operations and pipeline execution may be increased correspondingly. In addition, if a primitive having a translucent property is generated, a visibility relationship may not be determined just based on a depth value, and thus, performing visibility calculations prior to performing rendering may not significantly impact an amount of overdraws. A translucent property, for example, shows an object behind it, but also obscures the object behind it. A translucent property will cause a reflection of some light that strikes it, which makes a material having a translucent property to be visible. Accordingly, if a primitive placed at the front has a translucent property, even a primitive placed thereafter has visibility due to light passing through the front primitive.

According to an example embodiment of the inventive concept, by selectively performing a visibility calculation on at least one primitive included in a tile based on an estimated depth complexity, a processing method may be adaptively modified according to circumstances.

Finally, in operation 230, the graphics processing system performs rendering on the tile. The graphics processing system may drive a rendering pass in which rendering is performed on the primitives. According to an example embodiment, when the graphics processing system has performed visibility calculation in operation 220, the graphics processing system performs rendering on the tile based on a visibility of at least one primitive included in the tile. If visibility calculations are omitted, according to an embodiment of the inventive concept all primitives included in the tile may be rendered, and visibility of the primitives is determined based on a result of the rendering.

The graphics processing method according to the example embodiment is described above. Hereinafter, the operations of the graphics processing method will be described in more detail.

The graphics processing system may divide a tile into a plurality of sub-tiles, and may determine an amount of overlap based on the number of times that each sub-tile and at least one primitive included in the sub-tile overlap each other. Through this determining operation, although an exact average amount of overlap up to the fragment level may not be calculated, a depth complexity at an approximate level to the level of sub-tiles may be estimated. When using sub-tiles, a method of determining an amount of overlap may be similar to a function of a binning unit. For example, a binning unit may be used for classifying to which tiles the primitives belong. Thus, a binning pipeline datapath of the binning unit may be used when determining an amount of overlap of primitives of the sub-tiles without change to the binning unit to minimize hardware costs. The operation of calculating an amount of overlap will be described in more detail with reference to FIG. 3.

Figure 3:
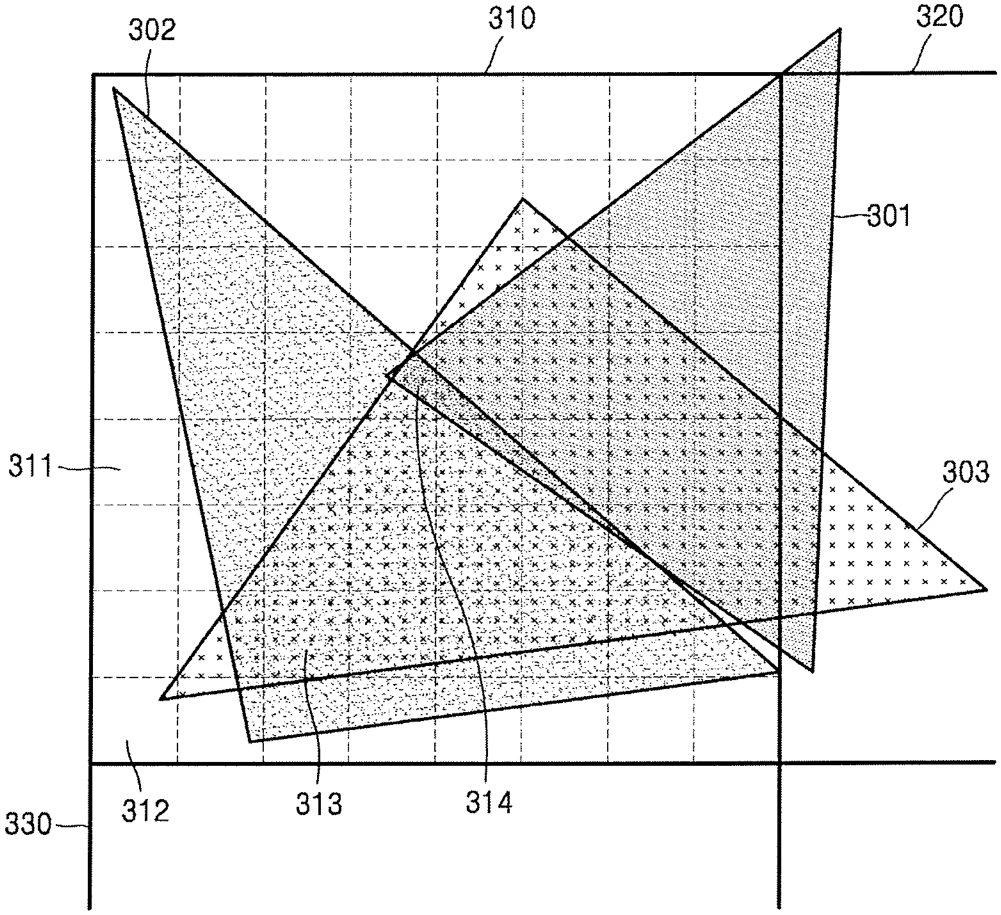
FIG. 3 illustrates an operation of calculating an amount of overlap of at least one primitive included in a tile, according to an example embodiment of the inventive concept.

FIG. 3 illustrates an operation of calculating an amount of overlap of at least one primitive included in a tile, according to an example embodiment of the inventive concept.

Referring to FIG. 3, a frame is divided into tiles 310, 320, 330 and so on. A graphics processing system may divide the tile 310 into smaller portions, namely, sub-tiles 311, 312, 313, 314 and so on. The number of sub-tiles may be appropriately determined based on a trade-off between accuracy of a final approximate value and calculation costs (for example, 4×4 or 8×8). In FIG. 3, one tile is divided into 8×8 sub-tiles, e.g., 64 sub-tiles. A person of ordinary skill in the art should understand and appreciate that the quantity of sub-tiles is not limited to 4×4 or 8×8.

Each sub-tile (in this case of the 64 sub-tiles) may be overlapped with at least one of the primitives 301, 302, and 303 or may not be overlapped at all. The graphics processing system may determine an amount of overlap based on the number of times that each sub-tile and the primitives 301, 302, and 303 overlap each other.

The amount of overlap may be determined based on a sum or an average of the number of times that each sub-tile and at least one primitive included in the sub-tile overlap each other. For example, the sum of the number of times of overlapping may be calculated by counting the number of times whenever each sub-tile and a primitive overlap each other. Alternatively, the average of the number of times that each sub-tile and at least one primitive included in the sub-tile overlap each other may be calculated by dividing the calculated sum of the number of overlapping times by the total number of sub-tiles. The value calculated as above is a relative value and not an absolute value, and thus, the depth complexity of a tile may be estimated by determining a relative amount of overlap of the tile.

According to an example embodiment of the inventive concept, when calculating the number of times that each sub-tile and the primitives 301, 302, and 303 overlap each other, a coverage table may be used. This will be described with reference to FIG. 4.

FIG. 4 illustrates a coverage table that may be used to calculate an amount of overlap of at least one primitive included in a sub-tile according to an example embodiment of the inventive concept.

Referring to FIG. 4, the coverage table corresponding to the number of sub-tiles generated by dividing in the example embodiment of FIG. 3 is shown. Each value of the coverage table denotes the number of times that a sub-tile at a corresponding location overlaps with a primitive. For example, the sub-tile 311 of FIG. 3 has no overlapping primitive and thus has a value of 0 in a table space 411 of the coverage table of FIG. 4. The sub-tile 312 of FIG. 3 overlaps once with the primitive 303, and thus has a value of 1 in a table space 412 of the coverage table of FIG. 4. In addition, the sub-tile 313 of FIG. 3 overlaps with the primitives 302 and 303, twice, and thus has a value of 2 in a table space 413 in the coverage table of FIG. 4. The sub-tile 314 of FIG. 3 overlaps three times, with the primitives 301, 302, and 303, and thus has a value of 3 in a table space 414 of the coverage table of FIG. 4.

Each time a sub-tile and a primitive overlap each other, the graphics processing system may increase a value (e.g., a count) of a corresponding table space of the coverage table at a corresponding location to update the coverage table. By completing the coverage table in this manner, all values may be added to calculate a sum, and an average may be calculated based on the sum. When calculating the sum, a summed area table may also be used.

In addition, the graphics processing system may calculate a relative area in which a tile and at least one primitive overlap each other, and may determine an amount of overlap based on the calculated relative area. The depth complexity indicates an amount that the fragments overlap each other. Thus, when a relative ratio of an area of a tile to a sum of areas of primitives overlapping with the tile is calculated, a depth complexity may be estimated based on the relative ratio. According to an example embodiment, a substantially rectangular bounding box surrounding at least one primitive may be generated, and a relative area in which a tile and at least one primitive overlap each other may be calculated by calculating an overlapping area between the tile and the bounding box. In addition, if a primitive has a triangular shape, an overlapping area between the tile and the bounding box may be divided by two so as to calculate an overlapping area between the tile and at least one primitive. In this manner, an overlapping area between the tile and the primitive may be calculated relatively accurately. In addition, when calculating an overlapping area by using a bounding box, a common area may be easily extracted through comparative operation between minimum and maximum coordinates of two rectangles, e.g., a tile and a bounding box, and thus, an overlapping area may be easily calculated. This procedure will now be described with reference to FIG. 5.

Figure 5:
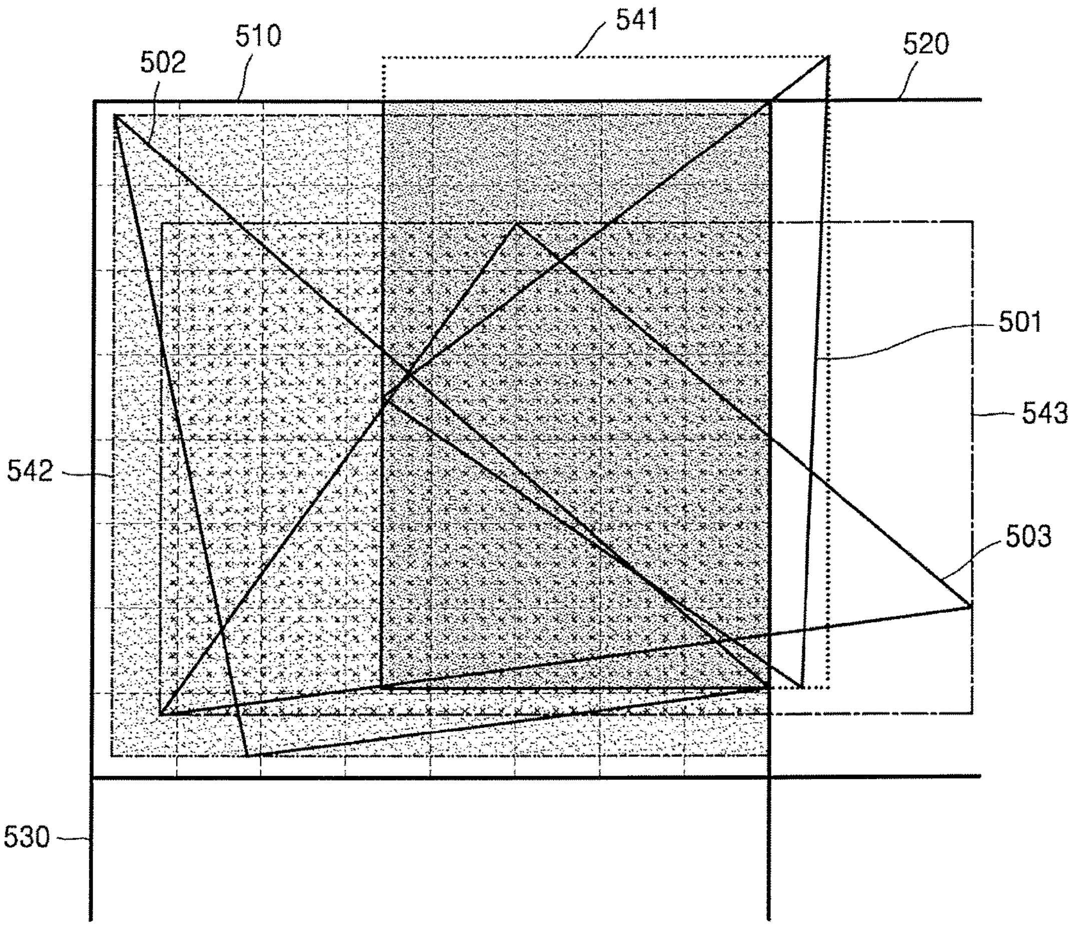
FIG. 5 illustrates an operation of calculating an overlapping area between a tile and a primitive, according to an example embodiment of the inventive concept.

FIG. 5 illustrates an operation of calculating an overlapping area between a tile and a primitive according to an example embodiment of the inventive concept.

Referring to FIG. 5, a frame is divided into tiles 510, 520, 530 and so on, and three primitives 501, 502, and 503 overlap with a tile 510. Substantially rectangular bounding boxes 541, 542, and 543 may surround the primitives 501, 502, and 503 respectively. A bounding box may be easily obtained based on minimum and maximum values of coordinates of a primitive. In addition, if a bounding box of a primitive is calculated in advance based on a binning algorithm, the calculated bounding box may be used without modification.

After conducting a binning calculation on each of the tiles 510, 520, and 530, a relative area where a tile and a primitive overlap each other may be calculated by using a bounding box with respect to the primitives included in the tiles 510, 520, and 530. The relative area obtained as described above includes relative values and not absolute values, and thus, a depth complexity of a tile may be estimated by determining a relative amount of overlap of the tile.

However, if a primitive has a triangular shape, a more accurate relative area where a tile and primitives included in the tile overlap each other may be calculated. In more detail, an area of a triangle corresponds to half of an area of a rectangle surrounding the triangle, and thus, an area of a primitive may be calculated by calculating an area corresponding to the half of the bounding box. The calculation may be conducted through a shift right operation, at relatively low costs. Accordingly, if a primitive has a triangular shape, an overlapping area between a tile and a bounding box may be calculated, and the overlapping area may be divided by two so as to calculate a more accurate relative area.

As described above, a relative area where a tile and at least one primitive overlap each other may be calculated, and an amount of overlap between the tile and the at least one primitive may be determined based on the relative area. In more detail, the amount of overlap may also be determined by dividing the relative area by a tile area. In general, a tile area corresponds to an exponent of 2 (for example, 32×32 or 16×16), and thus, the amount of overlap may be calculated through a shift right operation without having to use a hardware divider. In addition, when the tile area does not correspond to an exponent of 2, a division may be performed at low costs by using a reciprocal unit.

The graphics processing system may estimate a depth complexity of a tile from a previous frame for use as a depth complexity of the tile in a current frame. When calculating a depth complexity from a previous frame, instead of estimating an approximate value, an accurate depth complexity of a tile is calculated in a raster operation, which is a final operation of rendering. The calculated depth complexity is estimated as a depth complexity of a next frame in an operation of rendering the next frame. In this process, a frame to frame coherence, which is a conventional property, may be used. Rendering results are often highly similar between continuous frames, geometrically (object space) or in terms of image space. Therefore, a depth complexity calculated from a previous frame may be used as a depth complexity with respect to a current frame.

Figure 6:
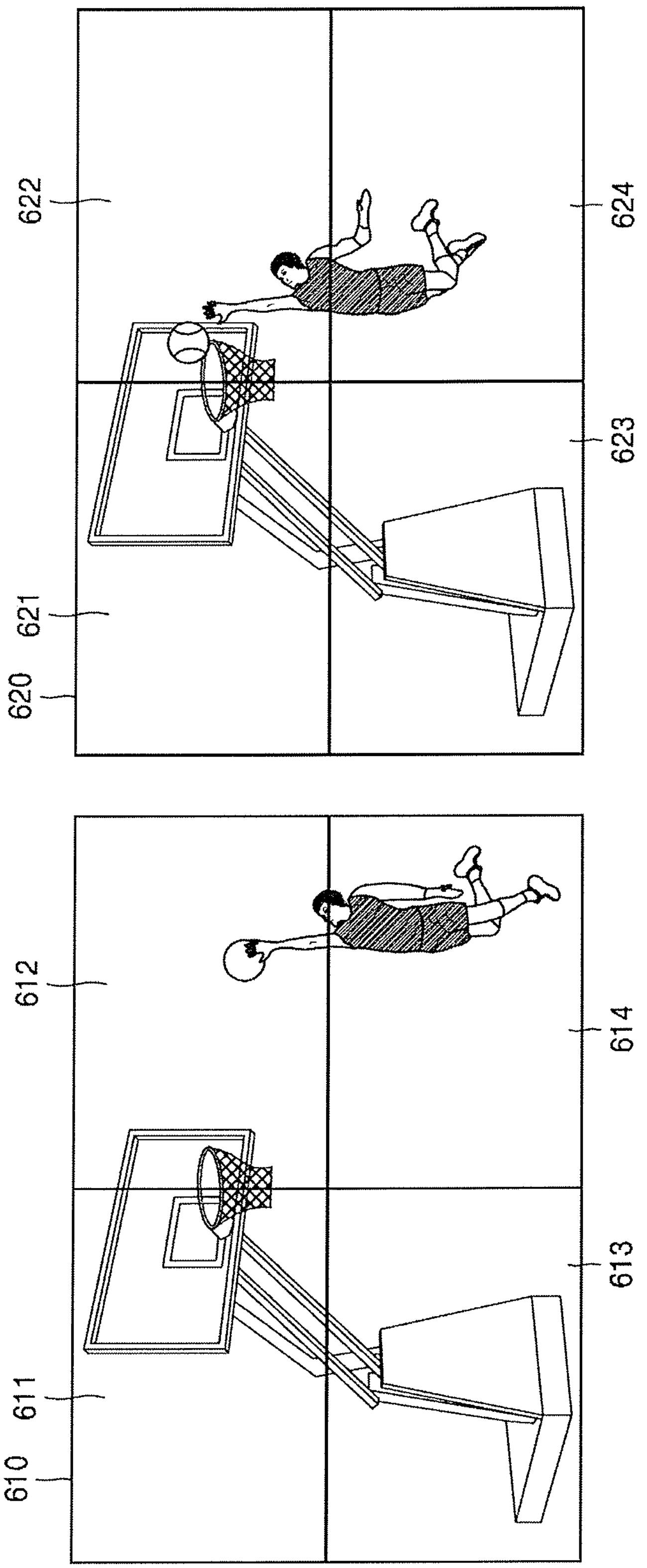
FIG. 6 is a view illustrating an operation of estimating a depth complexity of a tile of a previous frame as a depth complexity of a tile of a current frame, according to an example embodiment of the inventive concept.

FIG. 6 is a view illustrating an operation of estimating a depth complexity of a tile of a previous frame as a depth complexity of a tile of a current frame, according to an example embodiment of the inventive concept.

Referring to FIG. 6, frames 610 and 620 are consecutive frames. As shown in FIG. 6, the frames 610 and 620 are very similar. Accordingly, tiles 611, 612, 613, and 614 constituting a frame 610 and tiles 621, 622, 623, and 624 constituting a frame 620 also have similarity with each other. Accordingly, a depth complexity of a tile from a previous frame may also be estimated as a depth complexity of the tile in a current frame. The similarity between frames may have a highest correlation when the previous frame and the current frame are consecutive.

The above operation will now be described in detail. In an operation of rendering the previous frame, an accurate depth complexity is calculated in a raster operation in which a depth test is conducted on each fragment, and the depth complexity is recorded (written) in a tile buffer for each tile. As rendering of the previous frame is completed and a rendering result is flushed to a frame buffer, a depth complexity of each tile is stored in a memory. The memory may store depth complexities of all tiles of the previous frame. When rendering on a next frame is performed, the depth complexities of the tiles of the previous frame stored in the memory are transmitted together while allocating the tile, and the transmitted depth complexities of the previous frame are estimated as depth complexities of the current frame.

According to an example embodiment of the inventive concept, if there is no similarity between a current frame and a previous frame, after performing rendering on a tile, the graphics processing system may calculate a depth complexity of the tile and store the same. When a rendering sequence abruptly changes due to conversion of a context of an image, a similarity between frames is discontinued, and thus, it is difficult to use information of a previous frame. In this case, whether there is no similarity between frames may be determined in advance to reset previous frame information, and a coherency mechanism is started again.

The graphics processing system may determine whether a primitive that has translucent properties, the primitive being analyzed is selected from among at least one primitive included in a tile, is to be processed prior to the occurrence of a preset point of time. When a primitive having translucent properties is processed prior to the occurrence of the preset point of time, rendering on the tile may be performed without estimating a depth complexity of the tile, or calculating a visibility of the at least one primitive included in the tile. In addition, if a primitive having translucent properties is processed after occurrence of the preset point of time, a depth complexity of a tile up to a point prior to processing a primitive having translucent properties may be estimated, and visibility calculations of the at least one primitive included in the tile may be selectively performed based on the estimated depth complexity. The occurrence of the preset point of time may be determined from when a translucent primitive is input. A person of ordinary skill in the art should understand and appreciate that other ways may be utilized to determine the occurrence of a preset point of time that are within the inventive concept.

If a primitive having translucent properties is included in a tile, a visibility calculation is not performed after a point of time when the primitive is processed. When a primitive having translucent properties is generated, it may be difficult to determine a visibility relationship between primitives just based on a depth value of the primitive, and thus, calculating a visibility of the primitive before performing rendering may not significantly impact the display of a frame. However, prior to processing a primitive having translucent properties, a graphics processing performance may vary according to when a primitive having translucent properties is processed. In detail, the graphics processing system receives a primitive stream via a drawcall command of an Application Programming Interface (API) in a device driver. The processing order of a primitive having translucent properties processed in the graphics processing system varies. For example, depending on where within a primitive stream a primitive having translucent properties is located, such a processing order may result in the visibility calculation being performed or not performed. When a primitive having translucent properties is located in a back portion of a primitive stream, the number of primitives that are to be transmitted and processed prior to the primitive having translucent properties may be large and the gain realized by performing a visibility calculation may be high. However, if a primitive having translucent properties is located in a front portion of a primitive stream, the number of primitives that are to be transmitted and processed before the primitive having translucent properties being processed may be small, and the costs associated with performing a visibility calculation may be greater than gain realized. Thus, according to an example embodiment of the inventive concept, a method of processing primitives may be adaptively modified by selectively conducting a visibility calculation with respect to primitives according to a processing point of a primitive having translucent properties.

The graphics processing method according to the example embodiment is described above. Hereinafter, a graphics processing apparatus according to the inventive concept will now be described. Details already-described above may only be briefly discussed herein below.

Figure 7:
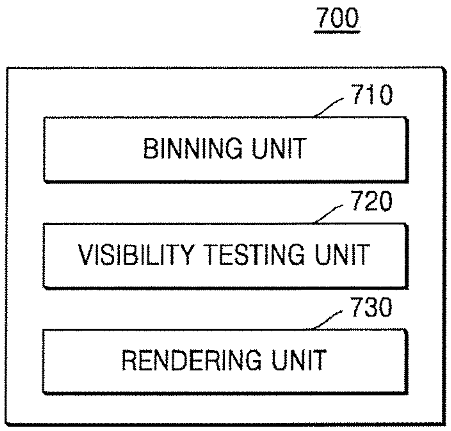
FIG. 7 is a structural diagram of a graphics processing apparatus according to an example embodiment.

FIG. 7 is a structural diagram of a graphics processing apparatus 700 according to an example embodiment of the inventive concept.

Referring to FIG. 7, the graphics processing apparatus 700 includes a binning unit 710, a visibility testing unit 720, and a rendering unit 730.

The binning unit 710 may divide a two-dimensional frame into a plurality of tiles, and perform binning on the tiles. Tile binning refers to determining tiles that include at least one primitive. The binning unit 710 may determine to which of a plurality of tiles constituting a two-dimensional frame a primitive belongs, based on information about primitives included in an object. For example, as illustrated in FIG. 3, a two-dimensional frame may include tiles 310, 320, 330, and so on, and the binning unit 710 may determine which tile of these tiles includes a particular primitive.

The binning unit 710 may be configured to estimate a depth complexity of tiles that are generated by dividing a frame. According to an example embodiment, the binning unit 710 may calculate an amount of overlap between a tile and at least one primitive included in the tile, and may estimate a depth complexity of the tile based on the amount of overlap. The binning unit 710 may further divide a tile into a plurality of sub-tiles, and may determine an amount of overlap based on the number of times that each sub-tile and at least one primitive included in the sub-tile overlap each other. The binning unit 710 may calculate an average or a sum of the number of times that each sub-tile and at least one primitive included in the sub-tile overlap each other.

The binning unit 710 may be configured to calculate a relative area where a tile and at least one primitive overlap each other, and may determine an amount of overlap based on the relative area. According to an example embodiment, the binning unit 710 may generate a substantially rectangular bounding box surrounding at least one primitive, and calculate an overlapping area between a tile and the bounding box, and divide the overlapping area between the tile and the bounding box by two so as to calculate an overlapping area between the tile and the primitive.

The binning unit 710 may be configured to estimate a depth complexity of a tile of a previous frame as a depth complexity of the tile in a current frame. According to an example embodiment, if there is no similarity between a current frame and a previous frame thereto, the binning unit 710 may perform rendering on a tile, and calculate a depth complexity of the tile and store the calculated depth complexity.

The binning unit 710 may determine whether a primitive having translucent properties, from among at least one primitive input to a tile, is input prior to the occurrence of a preset point of time.

The visibility testing unit 720 may perform a visibility test on primitives included in each of a plurality of tiles. According to an example embodiment, the visibility testing unit 720 may operate a ray tracing method to perform a visibility test on primitives respectively included in the tiles. However, the visibility testing unit 720 may also perform a visibility test by using other methods. A test result obtained by the visibility testing unit 720 may be used in an operation of rendering a primitive, subsequently performed by the rendering unit 730.

The visibility testing unit 720 may selectively perform visibility calculation on at least one primitive included in a tile based on an estimated depth complexity.

If a primitive having translucent properties is processed prior to the occurrence of a preset point in time, the visibility testing unit 720 may omit estimating a depth complexity of a tile, or visibility calculation, with respect to at least one primitive included in the tile. If a primitive having translucent properties is processed subsequent to the occurrence of the preset point in time, the visibility testing unit 720 may estimate a depth complexity of a tile prior to processing the primitive having translucent properties, and may selectively conduct visibility calculation on at least one primitive included in the tile based on an estimated depth complexity.

For example, the visibility testing unit 720 may be configured to compare the estimated depth complexity with a preset threshold value, and if the estimated depth complexity is greater than the preset threshold value, the visibility testing unit 720 may conduct a visibility calculation on at least one primitive included in the tile. In addition, if the estimated depth complexity is smaller than the preset threshold value, the visibility testing unit 720 may not conduct a visibility calculation on at least one primitive included in the tile.

The rendering unit 730 may be configured to perform rendering on a tile. In more detail, the rendering unit 730 may perform rendering on at least one primitive included in the tile. According to an example embodiment, the rendering unit 730 may perform rendering on a tile based on a visibility with respect to at least one primitive.

Figure 8:
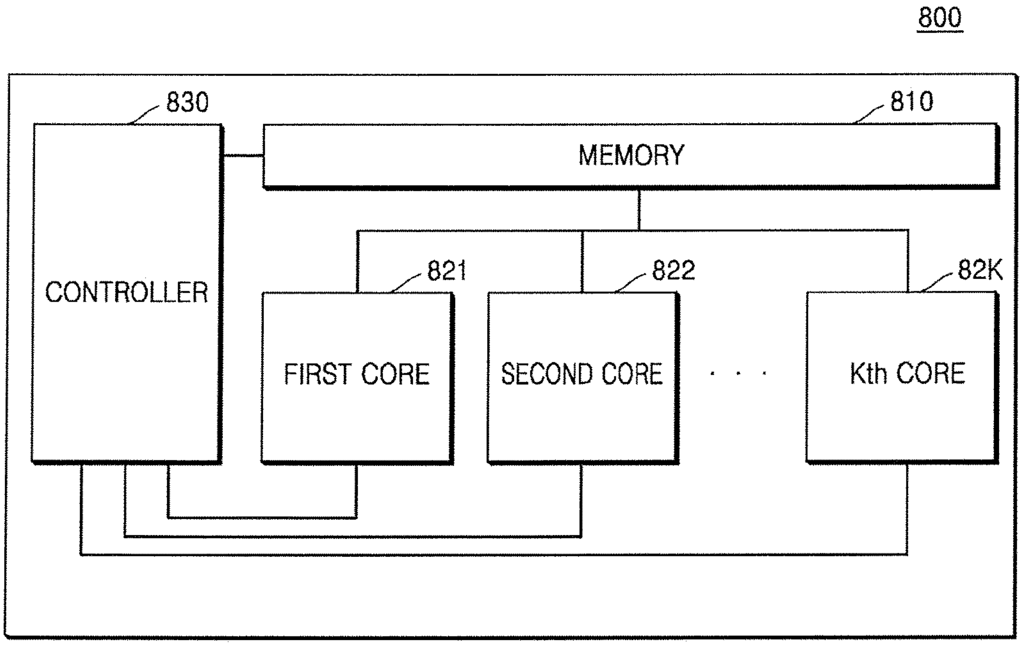
FIG. 8 illustrates an internal structure of a graphics processing apparatus according to an example embodiment of the inventive concept.

FIG. 8 illustrates an internal structure of a graphics processing apparatus 800 according to an example embodiment of the inventive concept.

Referring to FIG. 8, the graphics processing apparatus 800 may include a memory 810, at least one core, e.g., cores 821, 822, . . . , 82K and a controller 830.

The memory 810 is accessible by the at least one core, the cores 821, 822, . . . , 82K. The memory 810 stores data read from an external memory or data processed by the at least one core 821, 822, . . . , 82K. In addition, the memory 810 outputs data stored in the external memory and the at least one core 821, 822, . . . , 82K. According to an example embodiment, the memory 810 may store data to be rendered. In addition, intermediate data processed during rendering or final data may be stored in the memory 810.

The at least one core 821, 822, . . . , 82K reads and processes data. According to an example embodiment, the graphics processing apparatus 800 may read and process data from the memory 810, and may store a resultant value of the processing again in the memory 810. Each core may also process a plurality of threads. According to an example embodiment, the at least one core, which includes the cores 821, 822, . . . , 82K, may include at least one functional unit processing a thread and an internal memory. A functional block processes actual operations and may include an adder.

The controller 830 is configured to control an overall operation on data processing of the graphics processing apparatus 800 including the memory 810 and the at least one core 821, 822, . . . , 82K. The controller 830 may control the memory 810 and the at least one core 821, 822, . . . , 82K to estimate a depth complexity of tiles generated by dividing a frame, selectively conduct visibility calculation on at least one primitive included in the tiles based on the estimated depth complexity, and perform rendering on the tiles.

Figure 9:
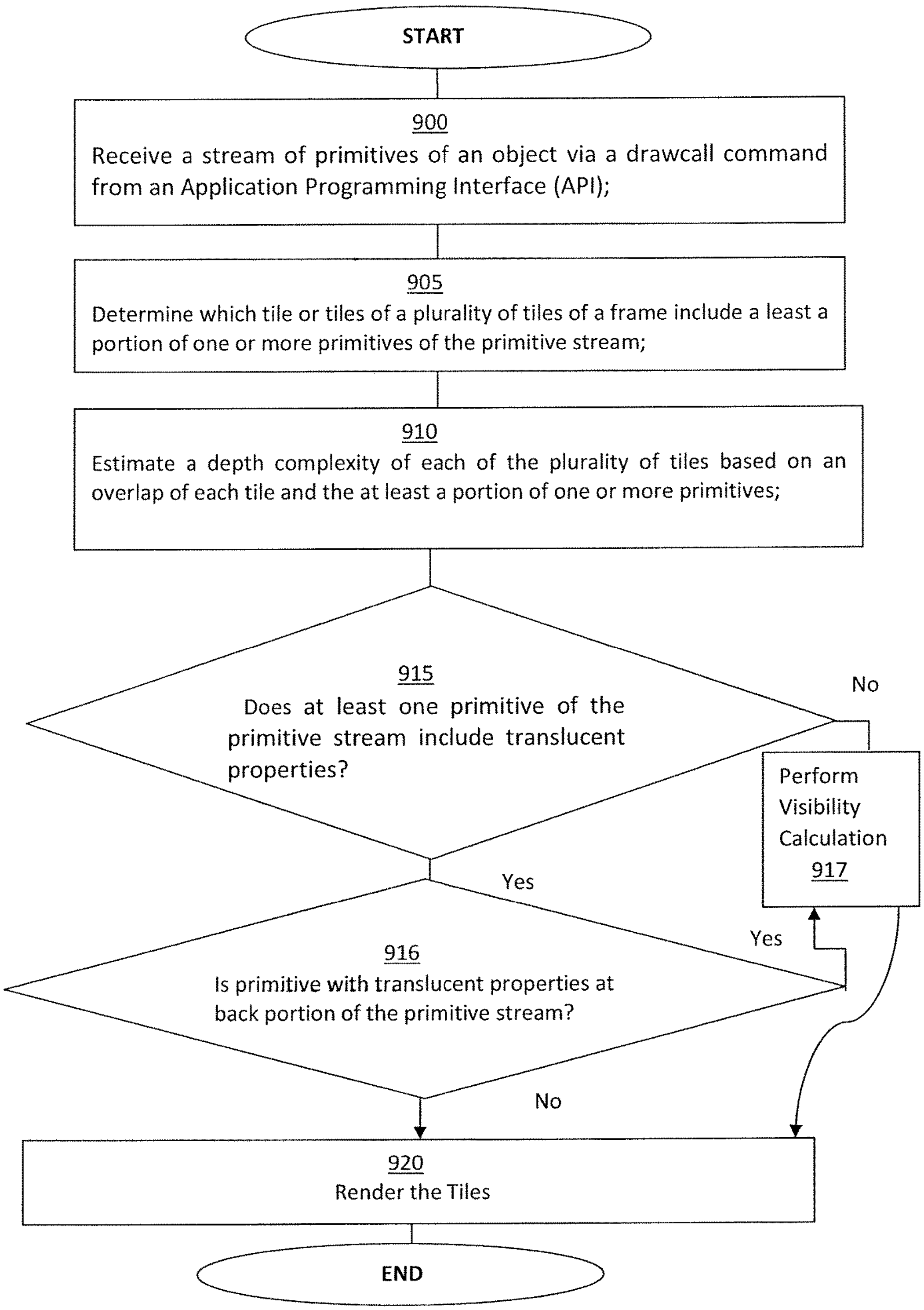
FIG. 9 is a flowchart illustrating operation of a graphics processing method according to an embodiment of the inventive concept.

FIG. 9 is a flowchart illustrating operation of a graphics processing method according to an embodiment of the inventive concept. A graphics processing apparatus, for example, a GPU, may be configured to execute the operations of the flowchart of FIG. 9.

With reference to FIG. 9, at operation 900 a stream of primitives of at least one object is received via a drawcall command send through an Application Programming Interface (API). The stream of primitives may be sent in an order associated with a display of the at least one object (e.g. one object may partially block/hide the display of another object.

At operation 905, a determination is made regarding which tile or tiles of the plurality of tiles of a frame (the frame being divided into a plurality of tiles) includes at least a portion of one or more primitives. FIG. 6, for example, shows two consecutive images divided into four tiles. Each of the objects in each tile may be presented by a plurality of primitives of points, lines, triangles, rectangles, etc. Although the embodiments construct primitives in triangles, the inventive concept is not limited to the use of triangles. For example, lines or rectangles are two possible non-limiting examples of primitive construction.

At operation 910, a depth complexity of each of the plurality of tiles may be estimated. As the estimated of depth complexity has been discussed herein above, a repetition is omitted herein.

At operation 915, there is a determination as to whether at least one primitive of the primitive stream includes translucent properties. If the graphics processing apparatus determines there are no such primitives, then at operation 917, visibility calculations may be performed, followed by the rendering of the tiles. Such visibility calculations may be made, for example, in a tile based deferred rendering (TBDR) mode, such that the graphics processing apparatus reduces or eliminates an amount of overdraw of items that may not be displayed in whole or in part because other items obstruct their view.

At operation 916, in view of determining at operation 915 that at least one primitive of the primitive steam includes translucent properties, another determination is made regarding whether the primitive with the translucent properties is at the front portion or the back portion of the primitive stream. As previously discussed herein above, if the primitive with translucent properties is at the back portion of the primitive stream, the visibility calculation is performed at operation 917 prior to rendering the tiles. However, if the primitive with the translucent properties is at the front portion of the primitive stream, the tiles may be rendered at operation 920 without performing the visibility calculation (e.g. operation 917 is omitted). As previously discussed, the number of primitives that may be transmitted and processed before the primitive with translucent properties located in a front portion of a primitive stream may be relatively small. Accordingly, in such a case, the costs of conducting visibility calculation may be greater than a gain from conducting the visibility calculation when the primitive with translucent properties is located in a front portion of the primitive stream.

Figure 10:
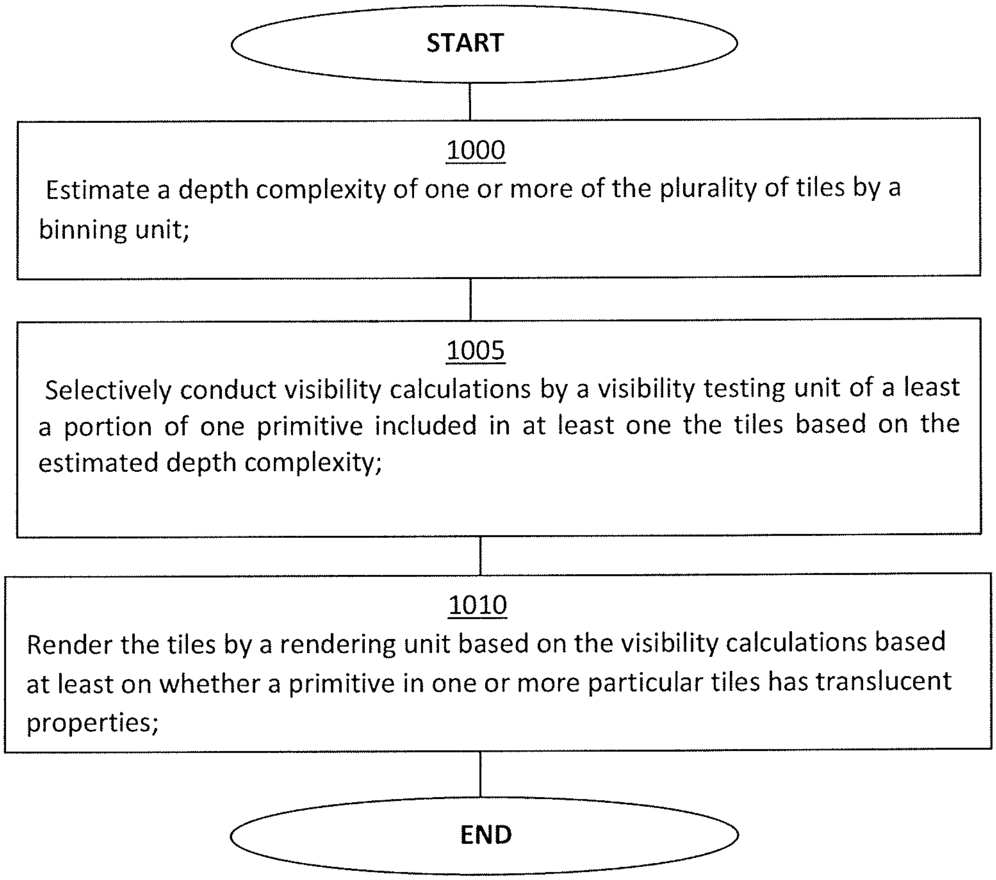
FIG. 10 is a flowchart illustrating operation of a graphics processing apparatus such as shown in FIG. 7.

FIG. 10 is a flowchart illustrating operation of the graphics processing apparatus such as shown in FIG. 7. A person of ordinary skill in the art should understand and appreciate that configurations other than shown in FIG. 7 are also within the inventive concept.

The graphics processing apparatus may include circuitry such as the binning circuit (e.g. binning unit), visibility testing circuit (e.g. visibility testing unit) and rendering circuit (e.g. rendering unit). The components may be, for example, part of a graphics processing unit (GPU) and may be comprised of integrated circuitry configured with executable code.

At operation 1000, the binning unit may estimate a depth complexity of one or more of a plurality of tiles. As previously discussed herein above, the binning unit may be configured to divide a frame into a plurality of tiles, and perform binning (e.g. determining which tiles of the plurality of tiles include at least one primitive). The binning unit may further divide the tiles into a plurality of sub-tiles, and determinations may be made regarding which primitives are at least partially included in one or more respective sub-tiles.

At operation 1005, a visibility testing unit may conduct visibility testing of at least one of the tiles based on the estimated depth complexity. According to the inventive concept, in view of the estimated depth complexity, the visibility calculation can be selectively performed based on whether a primitive in one or more of the particular tiles has translucent properties. For example, the visibility calculation may be omitted (e.g. skipped) based on whether the estimated depth complexity is smaller than a preset threshold value. For example, a comparator may be used to compare the estimated depth complexity with the preset threshold value.

At operation 1010, the rendering unit may render the tiles in view of the visibility calculations, or without performing the visibility calculations, as discussed herein above.

Thus, based on primitives input to a current tile, and in view of whether translucent properties of one or more primitives exist, the GPU may operate in a TBDR mode or a TBR mode according to a depth complexity of the current tile under consideration. Thus, according to an embodiment of the inventive concept, the TBDR mode selectively operates, rather than, for example, the GPU being switch to the TBR mode if there is a primitive within a primitive stream identified as having translucent properties.

The device described herein may include a processor, a memory for storing program data and execution, a permanent storage device such as a disk drive, a communications port for handling communications with external devices, and user interface devices, including a display, a keyboard, etc. When software modules are involved, these software modules may be stored as program instructions or computer readable codes executable by the processor on a computer-readable media such as magnetic storage media (e.g., read-only memory (ROM), random-access memory (RAM), floppy disks, hard disks, etc.) and optical recording media (e.g., CD-ROMs, DVDs, etc.). The computer readable recording medium can also be distributed over network coupled computer systems so that the computer readable code is stored and executed in a distributed fashion. This media can be read by the computer, stored in the memory, and executed by the processor.

The inventive concept may be described in terms of functional block components and various processing steps. Such functional blocks may be realized by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements of the inventive concept are implemented using software programming or software elements the inventive concept may be implemented with any programming or scripting language such as C, C++, Java, assembler, or the like, with the various algorithms being implemented with any combination of data structures, objects, processes, routines or other programming elements. The inventive concept may be implemented in algorithms that are executed by one or more processors. Furthermore, the inventive concept may employ any number of various configurations, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the inventive concept and do not limit the scope of the inventive concept in any way. For the sake of brevity, conventional electronics, control systems, software development and other system operations (and components of the individual operating components of the systems) may not have been described in detail herein. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar references in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") are provided herein to illuminate the inventive concept and does not pose a limitation on the scope of the inventive concept unless otherwise stated. Numerous modifications and adaptations will be readily apparent to those skilled in this art without departing from the spirit and scope of the inventive concept.

It should be understood that embodiments described herein should be considered in a descriptive sense only and not for purposes of limitation. Descriptions of an embodiment of the inventive concept may typically be considered as available for other embodiments.

While one or more embodiments of the inventive concept have been described with reference to the figures, it will be understood by those of ordinary skill in the art that various changes in form and details may be made therein without departing from the spirit and scope as defined by the following claims.

What is claimed is:

1. A graphics processing method comprising:

dividing a frame into a plurality of tiles;

estimating a depth complexity of an entire tile of the plurality of tiles to determine an overlap between objects in the frame;

selectively conducting visibility calculations with respect to at least one primitive included in the tile based on the estimated depth complexity of the tile; and performing rendering on the tile, wherein said selectively conducting visibility calculations with respect to the at least one primitive included in the tile comprises:

comparing the estimated depth complexity with a preset threshold value;

prior to performing the rendering on the tile, omitting visibility calculations with respect to the at least one primitive included in the tile if the estimated depth complexity is smaller than the preset threshold value; and conducting visibility calculations with respect to the at least one primitive included in the tile if the estimated depth complexity is greater than the preset threshold value, and if the visibility calculations have been conducted, the rendering is performed based on a visibility of the at least one primitive.

2. The graphics processing method of claim 1, wherein the estimating of the depth complexity of the tile comprises:

calculating an amount of overlap between the tile and the at least one primitive included in the tile; and estimating the depth complexity of the tile based on the amount of overlap.

3. The graphics processing method of claim 2, wherein the calculating of the amount of overlap between the tile and the at least one primitive included in the tile comprises:

dividing the tile into a plurality of sub-tiles; and determining the amount of overlap based on a number of times that each sub-tile and the at least one primitive included in each sub-tile overlap each other.

4. The graphics processing method of claim 3, wherein the determining of the amount of overlap based on the number of times that each sub-tile and the at least one primitive included in each sub-tile overlap each other comprises calculating an average or a sum of the number of times that each sub-tile of the plurality of sub-tiles and the at least one primitive included in each sub-tile overlap each other.

5. The graphics processing method of claim 2, wherein the calculating of the amount of overlap between the tile and the at least one primitive included in the tile comprises:

calculating a relative area where the tile and the at least one primitive overlap each other; and determining the amount of overlap based on the relative area.

6. The graphics processing method of claim 5, wherein calculating the relative area where the tile and the at least one primitive overlap each other comprises:

generating a substantially rectangular bounding box that surrounds the at least one primitive; and calculating an overlapping area between the tile and the substantially rectangular bounding box.

7. The graphics processing method of claim 1, wherein the frame is a current frame, and the estimating of the depth complexity of the tile comprises using a depth complexity computed for a corresponding tile from a previous frame as the depth complexity of the tile in the current frame.

8. The graphics processing method of claim 7, further comprising calculating and storing a depth complexity of the tile, if there is no similarity between the current frame and the previous frame, after performing rendering on the tile.

9. The graphics processing method of claim 1, further comprising:

determining whether a primitive having translucent properties, from among the at least one primitive included in the tile, is to be processed before an occurrence of a preset point in time;

when the primitive from among the at least one primitive included in the tile, having the translucent properties is processed before the occurrence of the preset point in time, performing rendering on the tile without estimating a depth complexity of the tile or without conducting visibility calculations with respect to the at least one primitive included in the tile.

10. The graphics processing method of claim 9, further comprising when the primitive having translucent properties is processed after the occurrence of the preset point in time, estimating a depth complexity of the tile up to a point of processing the primitive having translucent properties, and selectively conducting visibility calculations with respect to the at least one primitive included in the tile.

11. A graphics processing method comprising:

dividing a frame into a plurality of tiles;

estimating a depth complexity of a tile of the plurality of tiles to determine an overlap between objects in the frame;

selectively conducting visibility calculations with respect to at least one primitive included in the tile based on the estimated depth complexity of the tile; and performing rendering on the tile, wherein said estimating of the depth complexity of the tile comprises calculating an amount of overlap between the tile and the at least one primitive included in the tile, and estimating the depth complexity of the tile based on the amount of overlap, wherein said calculating of the amount of overlap between the tile and the at least one primitive included in the tile comprises calculating a relative area where the tile and the at least one primitive overlap each other, and determining the amount of overlap based on the relative area, wherein calculating the relative area where the tile and the at least one primitive overlap each other comprises generating a substantially rectangular bounding box that surrounds the at least one primitive and calculating an overlapping area between the tile and the substantially rectangular bounding box, and wherein calculating the relative area where the tile and the at least one primitive overlap each other comprises calculating an overlapping area between the tile and the at least one primitive, by dividing the overlapping area between the tile and the substantially rectangular bounding box by two.

12. A graphics processing system comprising:

a binning circuit configured to estimate a depth complexity of an entire tile generated by a current frame being divided;

a visibility testing circuit configured to selectively conduct visibility calculations with respect to at least one primitive included in the tile based on the estimated depth complexity of the tile; and a rendering circuit configured to perform rendering on the tile, wherein the visibility testing circuit selectively conducts the visibility calculations with respect to the at least one primitive included in the tile by;

comparing the estimated depth complexity with a preset threshold value;

prior to performing the rendering on the tile, omitting visibility calculations with respect to the at least one primitive included in the tile if the estimated depth complexity is smaller than the preset threshold value; and conducting visibility calculations with respect to the at least one primitive included in the tile if the estimated depth complexity is greater than the preset threshold value, and if the visibility calculations have been conducted, the rendering circuit performs the rendering on the tile based on a visibility of the at least one primitive.

13. The graphics processing system of claim 12, wherein the binning circuit is configured to calculate an amount of overlap between the tile and the at least one primitive included in the tile, and estimate a depth complexity of the tile based on the amount of overlap.

14. The graphics processing system of claim 13, wherein the binning circuit divides the tile into a plurality of sub-tiles, and determines the amount of overlap based on a number of times that each sub-tile and at least one primitive included in each sub-tile overlap each other.

15. The graphics processing system of claim 14, wherein the binning circuit determines the amount of overlap by calculating an average or a sum of the number of times that each sub-tile and at least one primitive included in each sub-tile overlap each other.

16. The graphics processing system of claim 13, wherein the binning circuit calculates a relative area where the tile and the at least one primitive included in the tile overlap each other and determines the amount of overlap based on the relative area.

17. The graphics processing system of claim 16, wherein the binning circuit generates a substantially rectangular bounding box surrounding the at least one primitive, and calculates an overlapping area between the tile and the substantially rectangular bounding box.

18. The graphics processing system of claim 12, wherein the binning circuit uses a depth complexity calculated for a corresponding tile in a previous frame as the estimated depth complexity of the tile in the current frame.

19. The graphics processing system of claim 18, wherein if there is no similarity between the current frame and the previous frame, after performing rendering on the tile of the current frame, the binning circuit calculates and stores a depth complexity of the tile of the current frame.

20. The graphics processing system of claim 12, wherein the binning circuit determines whether a primitive having translucent properties, from among the at least one primitive included in the tile, is to be processed prior to an occurrence of a preset point in time, and wherein, if the primitive having translucent properties is processed prior to the occurrence of the preset point in time, the visibility testing circuit omits estimating the depth complexity of the tile and conducting visibility calculations with respect to the at least one primitive included in the tile.

21. The graphics processing system of claim 20, wherein, if the primitive having translucent properties is processed after the preset point of time, the visibility testing circuit estimates a depth complexity of the tile before processing the primitive having translucent properties, and selectively conducts visibility calculations with respect to at least one primitive included in the tile based on the estimated depth complexity.

22. A graphics processing system comprising:

a binning circuit configured to estimate a depth complexity of a tile generated by a current frame being divided;

a visibility testing circuit configured to selectively conduct visibility calculations with respect to at least one primitive included in the tile based on the estimated depth complexity of the tile; and a rendering circuit configured to perform rendering on the tile, wherein the binning circuit is configured to calculate an amount of overlap between the tile and the at least one primitive included in the tile, and estimate a depth complexity of the tile based on the amount of overlap, wherein the binning circuit calculates a relative area where the tile and the at least one primitive included in the tile overlap each other, determines the amount of overlap based on the relative area, generates a substantially rectangular bounding box surrounding the at least one primitive, and calculates an overlapping area between the tile and the substantially rectangular bounding box, and wherein the binning circuit calculates an area where the tile and the at least one primitive included in the tile overlap each other, by dividing the overlapping area between the tile and the substantially rectangular bounding box by two.

23. A method of graphics processing operable by a graphics processing unit (GPU), the method comprising:

receiving a primitive stream comprising a plurality of primitives via a drawcall command from an Application Programming Interface (API);

determining which of a plurality of tiles of a frame include a least a portion of one or more primitives of the primitive stream;

estimating a depth complexity of an entire tile of the plurality of tiles based on an overlap of the tile and the at least a portion of one or more primitives;

determining, when at least one primitive of the primitive stream includes translucent properties, whether the at least one primitive having translucent properties is located at a front portion or a back portion of the primitive stream;

performing a visibility calculation on at least some of the plurality of tiles when the at least one primitive having translucent properties is located at the back portion of the primitive stream, and thereafter rendering the plurality of tiles; and rendering at least some of the plurality of tiles without performing a visibility calculation when the at least one primitive having translucent properties is located at the front portion of the primitive stream; and if the primitive stream does not include at least one primitive with translucent properties, selectively conducting visibility calculations for the tile based on the estimated depth complexity of the tile, which comprises:

comparing the estimated depth complexity with a preset threshold value;

prior to performing rendering on the tile, omitting visibility calculations with respect to the at least one primitive included in the tile if the estimated depth complexity is smaller than the preset threshold value; and conducting visibility calculations with respect to the at least one primitive included in the tile if the estimated depth complexity is greater than the preset threshold value, and if the visibility calculations have been conducted, rendering of the tile is performed based on a visibility of the at least one primitive.

24. The method according to claim 23, wherein if the primitive stream does not include at least one primitive with translucent properties:

the GPU operates in a tile based deferred rending (TBDR) mode for rendering the tile when the estimated depth complexity is greater than a predetermined threshold, the GPU operates in a tile based rendering (TBR) mode for rendering the tile when the estimated depth complexity is less than the predetermined threshold; and the frame is a current frame, and the estimating of the depth complexity of the tile comprises using a depth complexity computed for a corresponding tile from a previous frame as the estimated depth complexity of the tile of the current frame.

* * * * *